United States Patent [19]
Huang

[11] Patent Number: 5,982,651
[45] Date of Patent: Nov. 9, 1999

[54] HALF-BRIDGE SELF-EXCITING SWITCHING POWER SUPPLY WITH OVER-VOLTAGE CUT-OFF CAPABILITY

[75] Inventor: Chih-Ciang Huang, Taipei Hsien, Taiwan

[73] Assignee: Sen-Wen Chen, Taipei, Taiwan

[21] Appl. No.: 08/961,164

[22] Filed: Oct. 30, 1997

[30] Foreign Application Priority Data

Jul. 24, 1997 [TW] Taiwan ................................. 86212466

[51] Int. Cl.$^6$ .............................................. H02M 7/5387
[52] U.S. Cl. ................................. 363/132; 363/17; 363/18
[58] Field of Search ................................. 363/17, 38, 132, 363/34, 50; 361/91, 18, 54–56, 91.1, 91.5–91.8, 100

[56] References Cited

U.S. PATENT DOCUMENTS 3,418,554 12/1968 Legatti ......................................... 321/5
3,979,644 9/1976 Everhart ...................................... 317/20
5,324,971 6/1994 Notley ....................................... 257/328

*Primary Examiner*—Michael L. Gellner
*Assistant Examiner*—Nhung Nguyen
*Attorney, Agent, or Firm*—Ladas & Parry

[57] ABSTRACT

In a half-bridge self-exciting switching power supply, an over-voltage detector receives the power supply output and generates an over-voltage signal when the power supply output exceeds a preset limit. An over-voltage cut-off circuit is connected to a pulse-width-modulated controller and a driving unit of the switching power supply. The over-voltage cut-off circuit applies a pull-down voltage to the driving unit so as to inhibit self-exciting operation of first and second self-excited switching circuits of a half-bridge self-excited circuit, and disables the pulse-width-modulated controller upon reception of the over-voltage signal from the over-voltage detector. Therefore, when the pulse-width-modulated controller or the driving unit becomes defective, the switching power supply can be cut-off automatically in order to prevent damage to a load and to the other components of the switching power supply.

5 Claims, 3 Drawing Sheets

HALF-BRIDGE SELF-EXCITING SWITCHING POWER SUPPLY WITH OVER-VOLTAGE CUT-OFF CAPABILITY

BACKGROUND OF THE INVENTION

1. Field of the Invention

The invention relates to power supplies, more particularly to a half-bridge self-exciting switching power supply with an over-voltage cut-off capability.

2. Description of the Related Art

Referring to FIG. 1, a conventional half-bridge self-exciting switching power supply is shown to comprise a rectifier circuit 1, a pulse-width-modulated inverter 2 and a power transformer unit 3. The rectifier circuit 1 includes a bridge rectifier (BD1) and capacitor filters (C1, C2). The pulse-width-modulated inverter 2 includes a half-bridge self-excited circuit 20, a pulse-width-modulated (PWM) controller 21 and a driving unit 22. The half-bridge self-excited circuit 20 is connected to the rectifier circuit 1 and includes a first self-excited switching circuit with a first transistor (Q1), and a second self-excited switching circuit with a second transistor (Q2). The driving unit 22 includes a driving transformer (T2) coupled to the first and second self-excited switching circuits of the half-bridge self-excited circuit 20, and first and second driving transistors (Q3, Q4). The power transformer unit 3 includes an isolation transformer (T1) coupled to the driving unit 22 and connected to the rectifier circuit 1. The isolation transformer (T1) provides two output voltages which are rectified and filtered by rectifier and filter circuits (not shown) to obtain two dc power supply outputs, namely +5V and +12V. The PWM controller 21 includes a voltage feedback circuit 210 which receives the dc power supply outputs, and a pulse-width-modulating unit (IC1), such as the 7500 or TL494 integrated circuit by Samsung. The pulse-width-modulating unit (IC1) is connected to the voltage feedback circuit 210 and the driving unit 22.

In operation, a 230V/110V ac line voltage input is processed by the bridge rectifier (BD1) of the rectifier circuit 1 before being filtered by the capacitor filters (C1, C2) in order to generate a higher voltage rectified dc signal, e.g. 300 volts, which is supplied to the half-bridge self-excited circuit 20 of the pulse-width-modulated inverter 2. Upon biasing, the first transistor (Q1) of the first self-excited switching circuit of the half-bridge self-excited circuit 20 conducts, thereby generating a current (I1) in the first self-excited switching circuit for energizing the driving transformer (T2) of the driving unit 22. Upon saturation of the first transistor (Q1), the first self-excited switching circuit is cut-off, and the second transistor (Q2) of the second self-excited switching circuit of the half-bridge self-excited circuit 20 is biased into conduction, thereby generating a current (I2) in the second self-excited switching circuit for continued energizing of the driving transformer (T2). The second self-excited switching circuit is cut-off when the second transistor (Q2) becomes saturated. The alternating conduction of the first and second self-excited switching circuits is referred to as a half-bridge self-exciting operation. Energizing of the driving transformer (T2) by the currents (I1, I2) of the first and second self-excited switching circuits enables the power transformer unit 3 to provide the +5V and +12V dc power supply outputs.

The voltage feedback circuit 210 of the PWM controller 21 provides the dc power supply outputs to the pulse-width-modulating unit (IC1). Upon comparing the dc power supply outputs with reference voltage values, the pulse-width-modulating unit (IC1) generates pulse drive signals for the first and second driving transistors (Q3, Q4) of the driving unit 22, thereby controlling the on-off ratios of the first and second self-excited switching circuits of the half-bridge self-excited circuit 20.

It can be understood from the foregoing that the conventional half-bridge self-exciting switching power supply relies primarily on the PWM controller 21 and the driving unit 22 to prevent over-voltage of the power supply outputs. However, if the PWM controller 21 or the driving unit 22 becomes defective, the self-exciting operation of the first and second self-excited switching circuits will go on uninterrupted. This is possible when the pulse-width-modulating unit (IC1) is unable to compare the dc power supply outputs with the reference voltage values, or when one of the first and second driving transistors (Q3, Q4) or the driving transformer (T2) is damaged. Uninterrupted self-exciting operation of the first and second self-excited switching circuits will result in the dc power supply outputs exceeding the required +5V and +12V values, thereby damaging the load (not shown) that is connected to the switching power supply. This is best illustrated in FIG. 2. After the power supply output peaks at (A), the power supply output then decreases due to internal damage of the switching power supply, as shown at (B) in FIG. 2.

SUMMARY OF THE INVENTION

Therefore, the object of the present invention is to provide a half-bridge self-exciting switching power supply which is capable of limiting the power supply output thereof to within a safe range in order to prevent damage to a load even when a PWM controller or a driving unit of the switching power supply becomes defective.

According to the present invention, a half-bridge self-exciting switching power supply comprises:

a rectifier circuit adapted to receive an alternating current voltage input, the rectifier circuit rectifying the alternating current voltage input so as to generate a rectified direct current voltage signal;

a pulse-width-modulated inverter including a half-bridge self-excited circuit connected to the rectifier circuit so as to receive the rectified direct current voltage signal therefrom, the half-bridge self-excited circuit including first and second self-excited switching circuits which turn on and turn off alternatingly, the pulse-width-modulated inverter further including a driving unit which has a driving transformer coupled to the first and second self-excited switching circuits;

a power transformer unit connected to the rectifier circuit and coupled to the driving transformer for providing at least one direct current power supply output;

the pulse-width-modulated inverter further including a pulse-width-modulated controller which receives the power supply output and which is connected to the driving unit, the pulse-width-modulated controller generating pulse drive signals to the driving unit in order to control on-off ratios of the first and second self-excited switching circuits upon comparing the power supply output with a reference voltage value;

an over-voltage detector which receives the power supply output and which generates an over-voltage signal when the power supply output exceeds a preset limit; and an over-voltage cut-off circuit connected to the pulse-width-modulated controller, the driving unit and the over-voltage detector, the over-voltage cut-off circuit applying a pull-down voltage to the driving unit so as to inhibit self-exciting operation of the first and second self-excited switching circuits and disabling the pulse-width-modulated controller upon reception of the over-voltage signal from the over-voltage detector.

Thus, when the pulse-width-modulated controller or the driving unit becomes defective, the switching power supply can be cut-off automatically to prevent damage to a load and to the other components of the switching power supply.

BRIEF DESCRIPTION OF THE DRAWINGS

Other features and advantages of the present invention will become more apparent in the following detailed description of the preferred embodiment, with reference to the accompanying drawings, of which.

DESCRIPTION OF THE PREFERRED EMBODIMENT

Figure 1:
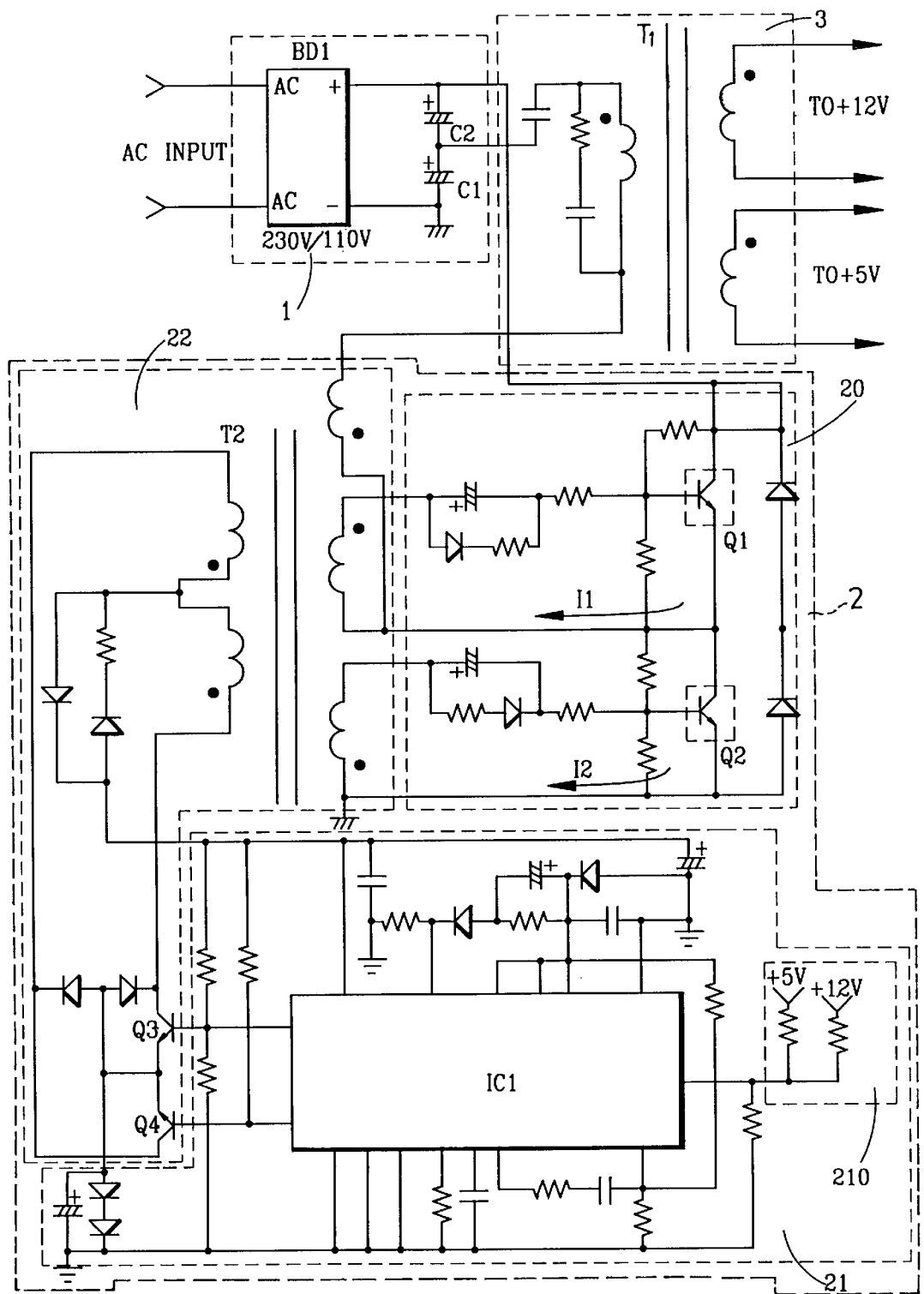
FIG. 1 is a schematic electrical circuit diagram of a conventional half-bridge self-exciting switching power supply.
Figure 2:
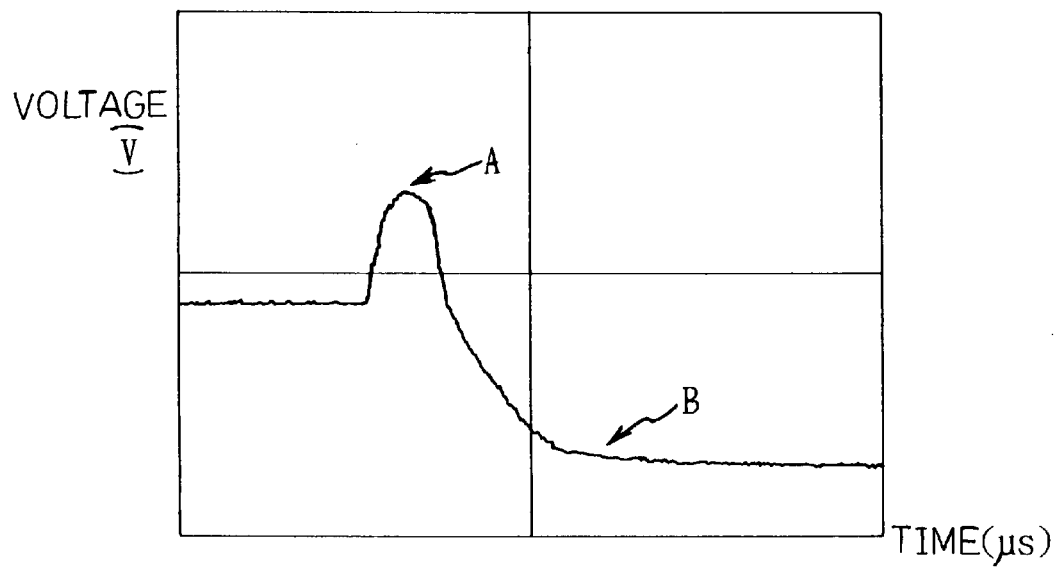
FIG. 2 illustrates an output waveform of the conventional switching power supply when a PWM controller or a driving unit of the same is damaged.

Before the present invention is described in greater detail, it should be noted that like elements are denoted by the same reference numerals throughout the disclosure.

Figure 3:
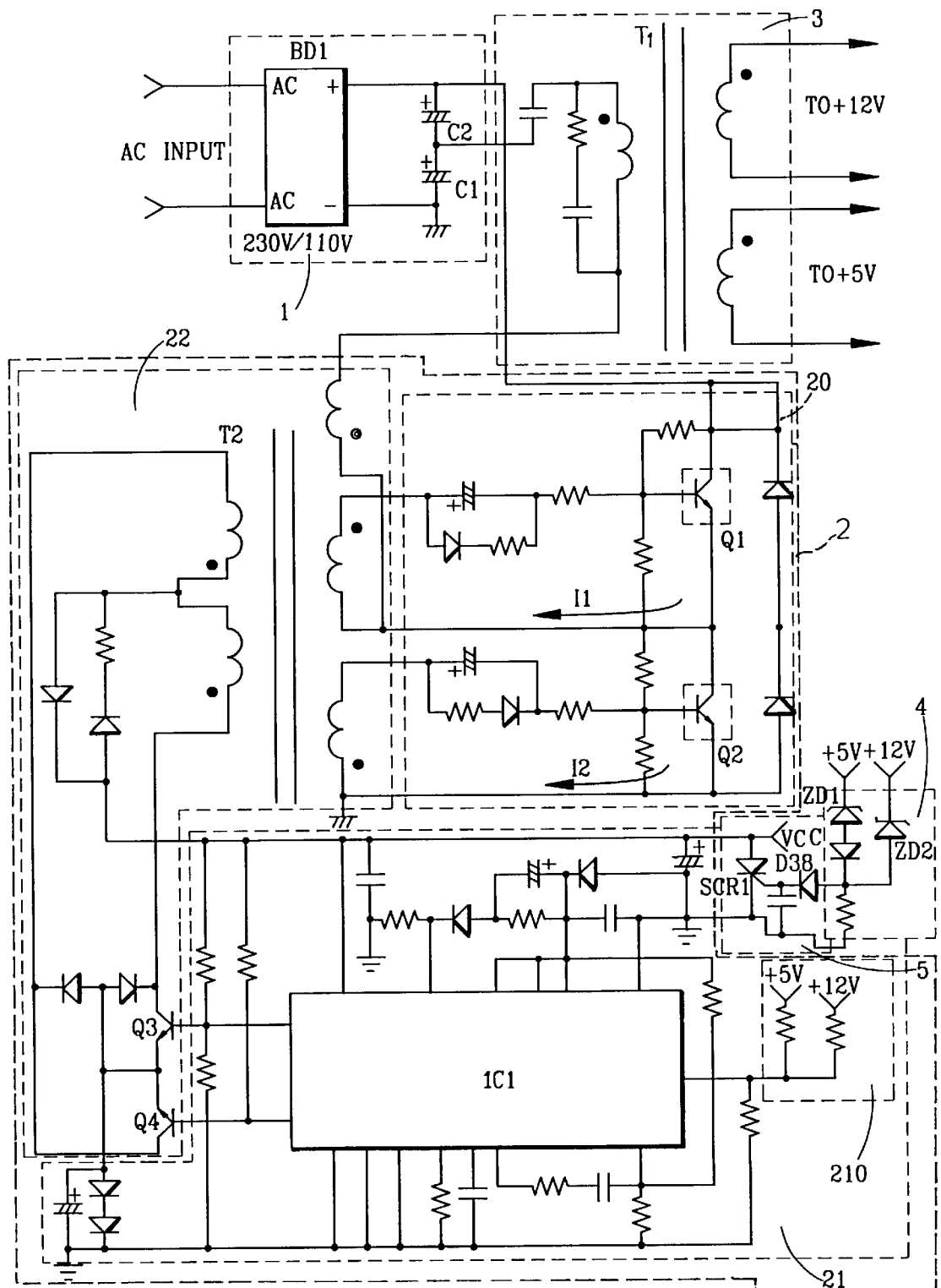
FIG. 3 is a schematic electrical circuit diagram of the preferred embodiment of a half-bridge self-exciting switching power supply according to the present invention.

Referring to FIG. 3, the preferred embodiment of a half-bridge self-exciting switching power supply with an over-voltage cut-off capability in accordance with the present invention is shown to comprise a rectifier circuit 1, a pulse-width-modulated inverter 2, a power transformer 3, an over-voltage detector 4 and an over-voltage cut-off circuit 5.

The rectifier circuit 1, the pulse-width-modulated inverter 2 and the power transformer 3 are similar to those shown in FIG. 1 and will not be described further.

The over-voltage detector 4 includes first and second zener diodes (ZD1, ZD2) which receive the power supply outputs respectively. The over-voltage cut-off circuit 5 includes a thyristor (SCR1), such as silicon controlled rectifier, which is connected to the PWM controller 21 and the driving unit 22, and a diode (D38) which interconnects the thyristor (SCR1) and the over-voltage detector 4.

In operation, when either of the power supply outputs exceeds a corresponding preset limit, breakdown of the corresponding one of the first and second zener diodes (ZD1, ZD2) occurs, thereby resulting in an over-voltage signal which is received by the over-voltage cut-off circuit 5. At this time, the thyristor (SCR1) of the over-voltage cut-off circuit 5 is triggered into conduction, thereby applying a pull-down voltage to the driving unit 22 so as to inhibit self-exciting operation of the first and second self-excited switching circuits of the half-bridge self-excited circuit 20. At the same time, the thyristor (SCR1) disables the pulse-width-modulating unit (IC1).

Figure 4:
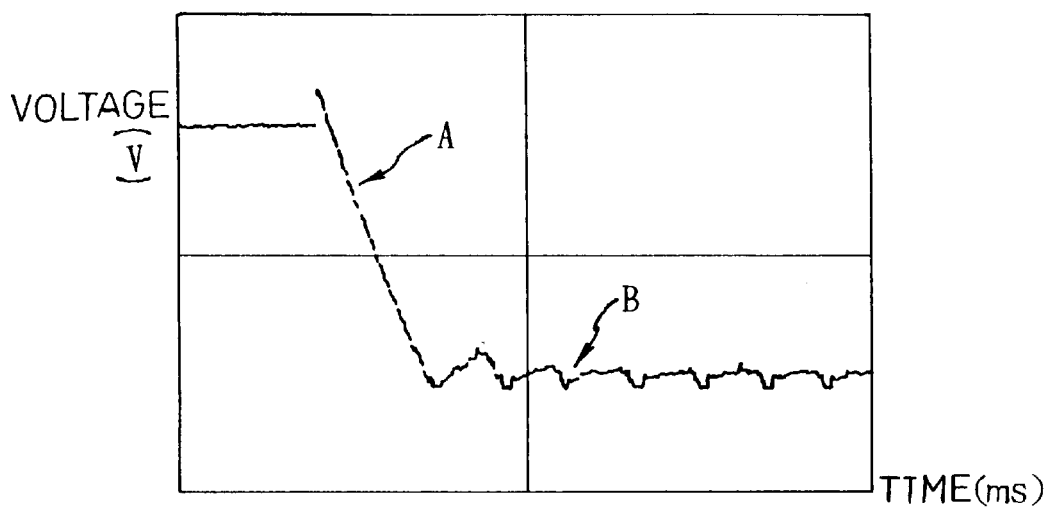
FIG. 4 illustrates an output waveform of the preferred embodiment when a PWM controller or a driving unit of the same is damaged.

The effect of the over-voltage detector 4 and the over-voltage cut-off circuit 5 in the switching power supply of this invention is best shown in FIG. 4. As illustrated, when one of the power supply outputs exceeds the corresponding preset limit at (C), the power supply output decreases at (D) due to the weaker switching action of the first and second transistors (Q1, Q2) of the first and second self-excited switching circuits when the self-exciting operation thereof is inhibited.

It has thus been shown that, in the present invention, when the PWM controller 21 or the driving unit 22 becomes defective, the self-exciting operation of the first and second self-excited switching circuits of the half-bridge self-excited circuit 20 will be inhibited. Therefore, even when the pulse-width-modulating unit (IC1) is unable to compare the power supply outputs with the reference voltage values, or when one of the driving transistors (Q3, Q4) or the driving transformer (T2) is damaged, the switching power supply can be cut-off automatically to prevent damage to a load (not shown) and to the other components of the switching power supply.

While the present invention has been described with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A half-bridge self-exciting switching power supply, comprising:

a rectifier circuit adapted to receive an alternating current voltage input, said rectifier circuit rectifying the alternating current voltage input so as to generate a rectified direct current voltage signal;

a pulse-width-modulated inverter including a half-bridge self-excited circuit connected to said rectifier circuit so as to receive the rectified direct current voltage signal therefrom, said half-bridge self-excited circuit including first and second self-excited switching circuits which turn on and turn off alternatingly, said pulse-width-modulated inverter further including a driving unit which has a driving transformer coupled to said first and second self-excited switching circuits;

a power transformer unit connected to said rectifier circuit and coupled to said driving transformer for providing at least one direct current power supply output;

said pulse-width-modulated inverter further including a pulse-width-modulated controller which receives the power supply output and which is connected to said driving unit, said pulse-width-modulated controller generating pulse drive signals to said driving unit in order to control on-off ratios of said first and second self-excited switching circuits upon comparing the power supply output with a reference voltage value;

an over-voltage detector which receives the power supply output and which generates an over-voltage signal when the power supply output exceeds a preset limit; and an over-voltage cut-off circuit connected to said pulse-width-modulated controller, said driving unit and said over-voltage detector, said over-voltage cut-off circuit applying a pull-down voltage to said driving unit so as to inhibit self-exciting operation of said first and second self-excited switching circuits and disabling said pulse-width-modulated controller upon reception of the over-voltage signal from said over-voltage detector.

2. A half-bridge self-exciting switching power supply as claimed in claim 1, wherein said over-voltage detector includes a zener diode.

3. A half-bridge self-exciting switching power supply as claimed in claim 1, wherein said power transformer unit provides two of the direct current power supply outputs, said over-voltage detector including two zener diodes which receive the power supply outputs respectively.

4. A half-bridge self-exciting switching power supply as claimed in claim 1, wherein said over-voltage cut-off circuit includes a thyristor which is connected to said pulse-width-modulated controller and said driving unit, and a diode which interconnects said thyristor and said over-voltage detector.

5. A half-bridge self-exciting switching power supply as claimed in claim 4, wherein said thyristor is a silicon controlled rectifier.

\* \* \* \* \*